(12) United States Patent
Jian et al.

(10) Patent No.: US 9,837,874 B2
(45) Date of Patent: Dec. 5, 2017

(54) FLYWHEEL ENERGY STORAGE DEVICE, WIND POWER GENERATION SYSTEM AND VEHICLE ENERGY FEEDBACK BRAKE SYSTEM

(71) Applicant: SOUTH UNIVERSITY OF SCIENCE AND TECHNOLOGY OF CHINA, Shenzhen (CN)

(72) Inventors: Linni Jian, Shenzhen (CN); Jin Wei, Shenzhen (CN); Yujun Shi, Shenzhen (CN)

(73) Assignee: SOUTH UNIVERSITY OF SCIENCE AND TECHNOLOGY OF CHINA, Shenzhen (CN)

( * ) Notice: Subject to any disclaimer, the term of this patent is extended or adjusted under 35 U.S.C. 154(b) by 0 days.

(21) Appl. No.: 15/101,074

(22) PCT Filed: Mar. 25, 2014

(86) PCT No.: PCT/CN2014/074031
§ 371 (c)(1),
(2) Date: Jun. 2, 2016

(87) PCT Pub. No.: WO2015/143623
PCT Pub. Date: Oct. 1, 2015

(65) Prior Publication Data
US 2017/0025922 A1    Jan. 26, 2017

(51) Int. Cl.
*H02K 7/02* (2006.01)
*H02J 3/30* (2006.01)
(Continued)

(52) U.S. Cl.
CPC ............... *H02K 7/025* (2013.01); *B60L 7/18* (2013.01); *B60L 11/16* (2013.01); *F03D 9/12* (2016.05);
(Continued)

(58) Field of Classification Search
CPC .. H02K 7/025; F03D 9/12; F03D 9/25; B60L 7/16; B60L 11/16; H02J 3/30; H02J 15/00
(Continued)

(56) References Cited

U.S. PATENT DOCUMENTS

| | | | |
|---|---|---|---|
| 2014/0125171 A1* | 5/2014 | Bremer | H02K 7/025 310/74 |
| 2014/0260779 A1* | 9/2014 | Prober | H02K 7/025 74/572.11 |

(Continued)

*Primary Examiner* — Tulsidas C Patel
*Assistant Examiner* — Sean Gugger
(74) *Attorney, Agent, or Firm* — Shimokaji IP

(57) ABSTRACT

Provided is a flywheel energy storage device including a radial magnetic gear, the radial magnetic gear includes an inner rotor, an outer rotor and $N_1$ first magnetic pole adjustment sheets embedded in a first magnetic pole adjustment sheet base; a disc-type magnetic gear electric motor includes a first stator disc, a first rotor disc, a second stator disc, a second rotor disc and a third rotor disc, the first stator disc with the first rotor disc form a first disc-type electric motor, the second stator disc with the second rotor disc form a second disc-type electric motor, and a disc-type magnetic gear is formed by the first rotor disc, the second rotor disc and the third rotor disc, and the first disc-type electric motor, the second disc-type electric motor and the disc-type magnetic gear are couple with one another to form the disc-type magnetic gear electric motor.

20 Claims, 6 Drawing Sheets

(51) Int. Cl.
| | |
|---|---|
| *B60L 7/18* | (2006.01) |
| *B60L 11/16* | (2006.01) |
| *H02J 15/00* | (2006.01) |
| *F03D 9/25* | (2016.01) |
| *H02K 5/00* | (2006.01) |
| *H02K 7/18* | (2006.01) |
| *H02K 51/00* | (2006.01) |
| *H02P 3/14* | (2006.01) |
| *F03D 9/12* | (2016.01) |
| *H02K 7/11* | (2006.01) |

(52) U.S. Cl.
CPC .................. *F03D 9/25* (2016.05); *H02J 3/30* (2013.01); *H02J 15/00* (2013.01); *H02K 5/00* (2013.01); *H02K 7/11* (2013.01); *H02K 7/183* (2013.01); *H02K 51/00* (2013.01); *H02P 3/14* (2013.01); *Y02E 10/766* (2013.01); *Y02E 60/16* (2013.01); *Y02E 70/30* (2013.01); *Y02T 10/641* (2013.01); *Y02T 10/7027* (2013.01); *Y02T 10/7033* (2013.01)

(58) Field of Classification Search
USPC .................................................... 290/44, 55
See application file for complete search history.

(56) References Cited

U.S. PATENT DOCUMENTS

| | | | | |
|---|---|---|---|---|
| 2014/0265674 | A1* | 9/2014 | Kalev | H02K 5/04 310/71 |
| 2014/0300224 | A1* | 10/2014 | Kalev | H02K 7/025 310/58 |
| 2016/0322881 | A1* | 11/2016 | Andrews | H02K 7/025 |
| 2017/0012489 | A1* | 1/2017 | Townend | H02K 7/025 |
| 2017/0037932 | A1* | 2/2017 | Teerlink | H02K 7/025 |

* cited by examiner

FLYWHEEL ENERGY STORAGE DEVICE, WIND POWER GENERATION SYSTEM AND VEHICLE ENERGY FEEDBACK BRAKE SYSTEM

FIELD OF THE TECHNICAL

The present disclosure relates to energy storage technology fields, and more specifically, to a flywheel energy storage device, a wind power generation system, and a vehicle energy feedback brake system.

BACKGROUND

Flywheel energy storage technology is an efficient mechanical energy storage technology which is a way to convert non-mechanical energy such as electrical energy, wind energy, and solar energy into kinetic energy of the flywheel. In recent years, since flywheel energy storage has the advantages of high energy density, high power density, and high energy conversion efficiency, at the same time, the flywheel energy storage is insensitive to temperature, friendly to the environment, and has longer service life, faster charging and discharging speed, and is easy for combination with other devices, so that the flywheel energy storage has obtained extensive research and application, especially has a good application prospects in the fields of system energy feedback and power regulations of a wind power generation system.

In order to reduce flywheel loss and improve energy storage efficiency of the flywheel, the flywheel is usually located in an airtight vacuum chamber. Therefore, in order to transfer the energy stored by the flywheel to a system, or transfer the mechanical energy of the system to the flywheel to be stored, a coupling device is required. The existing coupling device is designed to be a rotation shaft equipped with a rotary seal ring, and the rotation shaft can convert external energy into the kinetic energy of the flywheel. However, the rotary seal ring may inevitably produce gas leakage, with prolonged time of use, improvement of rotational speed, and increasing degree of aging, it would be far more likely to produce gas leakage for the rotary seal ring. Thus, in the existing flywheel energy storage device, an additional vacuum environment monitoring system is required to monitor working environment of the vacuum chamber and a vacuum holding system, thereof ensuring the flywheel work in a vacuum environment, which will result in increase the volume of the flywheel energy storage device and manufacturing cost.

A magnetic connector is used here to solve above-mentioned defects that the rotary seal ring can easily lead to gas leakage between physical contacts, the magnetic connector can omit the rotary seal ring and transfer the energy stored by the flywheel out of the vacuum chamber to the system without physical contact, or convert external energy into the kinetic energy of the flywheel to be stored without physical contact. Since the magnetic connector is used to the flywheel energy storage system, so that the rotary seal ring, the environment monitoring system and the vacuum holding system are omitted, thereof solving the defects of the existing rotary seal ring. However, an energy flow path of the flywheel energy storage device is very single, that is, the kinetic energy of the flywheel is transferred to rotating parts at low-speed side through rotating parts at high-speed side and a magnetic adjustment mechanism, or the mechanical energy at the low-speed side is transferred to a high-speed rotor in the vacuum chamber through the magnetic adjustment mechanism without contact, resulting in driving the flywheel accelerate, thus, the energy is stored in the flywheel. Thus, this flywheel energy storage device only has round-trip two single energy flow paths, which is not conducive to adjust the size of output-input power and flexibly configure energy. Moreover, the above mentioned flywheel energy storage device still has a larger size.

SUMMARY

A flywheel energy storage device is provided in embodiments of the present disclosure, which has smaller volume and a compact structure, and has a flexible and multidirectional energy flow path.

A first aspect of the present disclosure provides a flywheel energy storage device, the flywheel energy storage device includes: a vacuum shell, a flywheel, a radial magnetic gear, a disc-type magnetic gear electric motor and a second rotation shaft;

the vacuum shell includes a vacuum shell body, a first magnetic pole adjustment sheet base and an end cover; the vacuum shell defines a vacuum accommodating cavity surrounded by the vacuum shell, and the first magnetic pole adjustment sheet base is installed between the vacuum shell body and the end cover;

the flywheel is accommodated in the accommodating cavity and includes a first rotation shaft, and the first rotation shaft is rotatably installed to the vacuum shell body;

the radial magnetic gear includes an inner rotor, an outer rotor and $N_1$ first magnetic pole adjustment sheets; the inner rotor is located at the inside of the first magnetic pole adjustment sheet base, and the outer rotor is located at the outside of the first magnetic pole adjustment sheet base; the inner rotor is coaxially fixed with the first rotation shaft, and the inner rotor is provided with a first permanent magnet; the outer rotor is coaxially rotated relative to the inner rotor, and the outer rotor is provided with a second permanent magnet; and the $N_1$ first magnetic pole adjustment sheets are embedded in the first magnetic pole adjustment sheet base;

the disc-type magnetic gear electric motor is installed to the periphery of the outer rotor of the radial magnetic gear and includes a first stator disc, a first rotor disc, a second stator disc, a second rotor disc and a third rotor disc, and the first stator disc, the first rotor disc, the second stator disc, the second rotor disc and the third rotor disc have an annulus disc-like shape, and are arranged with the first rotation shaft in a coaxial manner; the first stator disc is fixed relative to the vacuum shell body, the first rotor disc, the third rotor disc, the second rotor disc, and the second stator disc, in turn, are alternately stacked at one side of the first stator disc which is far away from the vacuum shell body;

the first stator disc is provided with a first winding;

the first rotor disc is fixed to the outer rotor and faces toward the first stator disc, and the first rotor disc is provided with a third permanent magnet;

the second stator disc is fixed relative to the vacuum shell and is provided with a second winding, and the second stator disc faces toward the first stator disc;

the second rotor disc faces toward the second stator disc and is provided with a fourth permanent magnet;

the third rotor disc faces toward the first rotor disc and the second rotor disc, and $N_2$ second magnetic pole adjustment sheets are embedded in the third rotor disc;

the first stator disc with the first rotor disc form a first disc-type electric motor, the second stator disc with the second rotor disc form a second disc-type electric motor; a disc-type magnetic gear is formed by the first rotor disc, the second rotor disc and the third rotor disc, and the first disc-type electric motor, the second disc-type electric motor and the disc-type magnetic gear are coupled with one another to form the disc-type magnetic gear electric motor; and the second rotation shaft is coaxially fixed with the third rotor disc.

In a first possible implementation of the first aspect of the present disclosure, the first permanent magnet is magnetized along a radial direction or a parallel direction, the second permanent magnet is magnetized along a radial direction or a parallel direction; the $N_1$ first magnetic pole adjustment sheets are uniformly distributed along a first circumference of the first magnetic pole adjustment sheet base, and a rotational axis vertically passes through the center of the first circumference; the $N_1$ first magnetic pole adjustment sheets are insulated between each other, and each of the $N_1$ first magnetic pole adjustment sheets is insulated from the vacuum shell.

In a second possible implementation in combination with the first possible implementation of the first aspect of the present disclosure, the third permanent magnet and the fourth permanent magnet are magnetized along the direction parallel to the rotational axis; the third rotor disc includes a second magnetic pole adjustment sheet base, the $N_2$ second magnetic pole adjustment sheets are embedded in the second magnetic pole adjustment sheet base and are uniformly distributed along a second circumference of the second magnetic pole adjustment sheet base; the rotational axis vertically passes through the center of the second circumference.

In a third possible implementation of the first aspect of the present disclosure, the flywheel energy storage device includes a housing fixed to an outer wall of the vacuum shell body, and the housing and the vacuum shell body form a rotation cavity, and the second rotation shaft is rotatably installed to the housing and extends out from the housing.

In a fourth possible implementation in combination with the third possible implementation of the first aspect of the present disclosure, the flywheel energy storage device includes a first fixed base coaxial with the rotational axis, and the first fixed base is fixed on the outer wall of the vacuum shell body; one end of the first magnetic pole adjustment sheet base is fixed to the first fixed base, and the other end of the first magnetic pole adjustment sheet base extends along radial direction to form the end cover.

In a fifth possible implementation in combination with the fourth possible implementation of the first aspect of the present disclosure, the flywheel energy storage device further includes a first rotation shell and a second rotation shell, and the first rotation shell and the second rotation shell are coaxial with the rotational axis; the first rotation shell includes a rotating base and a rotating cylindrical body, and the first rotating base is fixed to one end of the rotating cylindrical body and is rotatably supported by the first fixed base; the rotating cylindrical body defines a second shaft hole, and the second shaft hole is located at one end of the rotating cylindrical body which is far away from the vacuum shell body, and the second shaft hole is coaxial with the rotational axis; the second rotation shell is a disc-like shape to correspondingly match the second shaft hole, and the second rotation shell is rotatably supported by the second rotation hole; the outer rotor is fixed to an inner wall of the rotating cylindrical body, and one end of the second rotation shaft which is close to the vacuum shell body is rotatably supported by the second rotation shell.

In a sixth possible implementation in combination with the third possible implementation of the first aspect of the present disclosure, flywheel energy storage device further includes a third rotation shell coaxial with the rotational axis, and the third rotation shell is an empty shell of revolving body; one end of the third rotation shell is connected to the second rotation shaft in integral manner, and the other end of the third rotation shell is fixedly connected to the third rotor disc;

the flywheel energy storage device further includes a fourth rotation shell coaxial with the rotational axis, and the fourth rotation shell is an empty shell of revolving body; one end of the fourth rotation shell is fixedly connected to the second rotor disc, and the other end of the fourth rotation shell is rotatably supported by the second rotation shaft.

In a seventh possible implementation in combination with the third possible implementation of the first aspect of the present disclosure, the housing defines a first connection hole and a second connection hole both of which are located at an outer wall of the housing; the first connection hole is electrically connected to the first winding of the first stator disc, and the second connection hole is electrically connected to the second winding of the second stator disc.

A second aspect of the present disclosure provides a wind power generation system, the winding power generation system includes a wind wheel, a first power converter, a second power converter, a power grid, and the flywheel energy storage device of any of above-mentioned possible implementations of the first aspect; the wind wheel is coaxially fixed to the second rotation shaft, the first winding of the first disc-type electric motor is electrically connected to the power grid through the first power converter, and the second winding of the second disc-type electric motor is electrically connected to the power grid through the second power converter.

A third aspect of the present disclosure provides a vehicle energy feedback brake system, the vehicle energy feedback brake system includes a vehicle drive axle, a third power converter, a fourth power converter, a direct current (DC) bus, and the flywheel energy storage device of any of above-mentioned possible implementations of the first aspect; an output shaft of the vehicle drive axle is coaxially fixed to the second rotation shaft, the first winding of the first disc-type electric motor is electrically connected to the DC bus through the third power converter, and the second winding of the second disc-type electric motor is electrically connected to the DC bus through the fourth power converter.

According to the flywheel energy storage device, the wind power generation system and the vehicle energy feedback brake system of the embodiments of the present disclosure, the radial magnetic gear is coaxially surrounded by the disc-type magnetic gear electric motor of the flywheel energy storage device, and the first disc-type electric motor and the second disc-type electric motor are coaxial disc-type structure, therefore shortening the axial length of the whole flywheel energy storage device, and reducing the volume of the whole flywheel energy storage device, and making the structure of the flywheel energy storage device more compact. In addition, the flywheel energy storage device also has a flexible energy flow path and can realize multipath transmission of energy among the second rotation shaft, the first winding, the second winding and the flywheel, that is, the energy can be transferred along multiple transmission paths among the second rotation shaft, the first winding, the second winding and the flywheel, thereof satisfying the demands for a variety of ways of energy utilization, supporting direct and efficient energy transfer of "mechanical energy-mechanical energy", and greatly reducing pressures of electric elements on power and capacity. In addition, all transmission of the flywheel energy storage device of the embodiments can be realized by magnetic non-contact structures, which can greatly improve transmission efficiency and enhance robustness of the system.

BRIEF DESCRIPTION OF THE DRAWINGS

In order to illustrate the embodiments or existing technical solutions more clearly, a brief description of drawings that assists the description of embodiments of the disclosure or existing art will be provided below. It would be apparent that the drawings in the following description are only for some of the embodiments of the disclosure. A person having ordinary skills in the art will be able to obtain other drawings on the basis of these drawings without paying any creative work.

DETAILED DESCRIPTION OF ILLUSTRATED EMBODIMENTS

Technical solutions in embodiments of the present disclosure will be illustrated clearly and entirely with the aid of the drawings in the embodiments of the disclosure. It is apparent that the illustrated embodiments are only some embodiments of the disclosure instead of all of them. Other embodiments that a person having ordinary skills in the art obtains based on the illustrated embodiments of the disclosure without paying any creative work should all be within the protection scope sought by the present disclosure.

Figure 1:
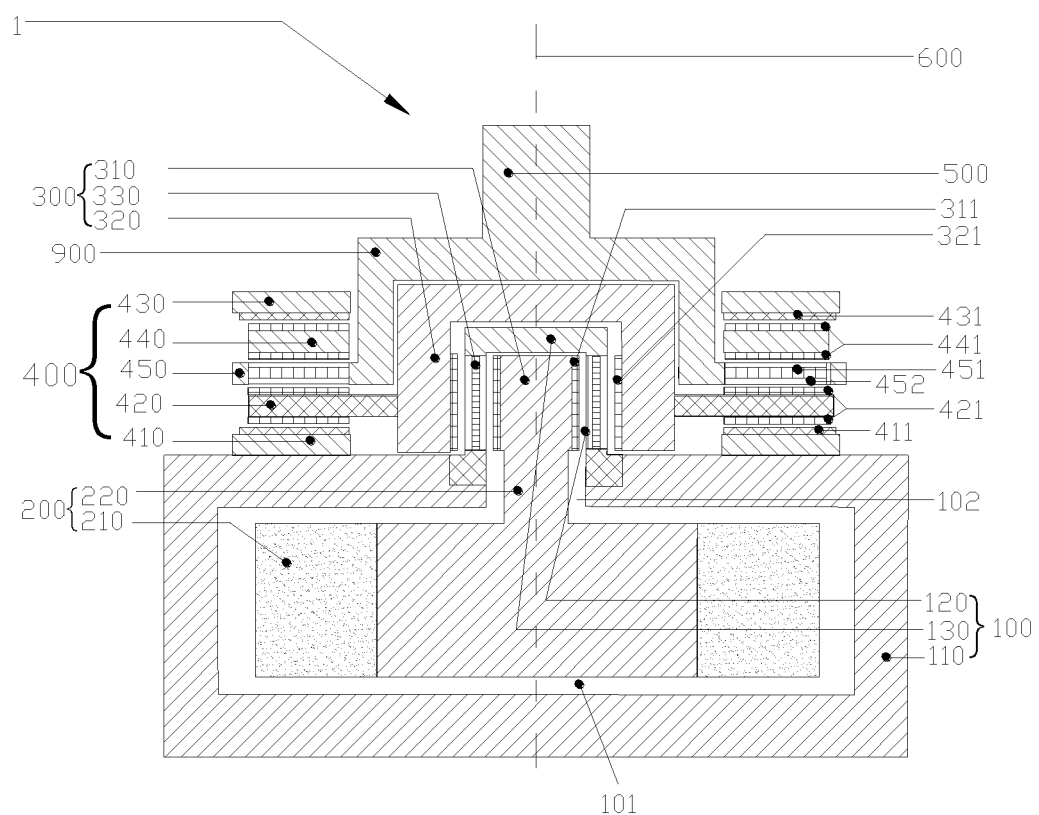
FIG. 1 is a structure diagram of a flywheel energy storage device according to one embodiment of the present disclosure.

Referring to FIG. 1, FIG. 1 is a structure diagram of a flywheel energy storage device 1 according to one embodiment of the present disclosure. The flywheel energy storage device 1 includes a vacuum shell 100, a flywheel 200, a radial magnetic gear 300, a disc-type magnetic gear electric motor 400, and a second rotation shaft 500.

In detail, the vacuum shell 100 includes a vacuum shell body 110, a first magnetic pole adjustment sheet base 120 and an end cover 130, and the vacuum shell 100 is a vacuum sealed housing surrounded by the vacuum shell body 110, the first magnetic pole adjustment sheet base 120 and the end cover 130. The vacuum shell 100 defines a first shaft hole 102 and an accommodating cavity 101 surrounded by the vacuum shell 100. The first pole magnetic adjustment sheet base 120 is installed between the vacuum shell body 110 and the end cover 130. The first pole magnetic adjustment sheet base 120 is designed as a tubular structure and extends outward from the edge of the first shaft hole 102 along the axial direction. The first pole magnetic adjustment sheet base 120 can be made from high-strength materials including but not limited to enhanced nylon, epoxy resin and phenolic resin, which are non-magnetic conductive and non-conductive materials. The end cover 130 is installed on one end of the first pole magnetic adjustment sheet base 120 which is far away from the vacuum shell body 110. For example, the first pole magnetic adjustment sheet base 120 includes a first end and a second end, and the first end is far away from the vacuum shell body 110 relative to the second end, and the end cover 130 is installed on the first end. The flywheel 200 is accommodated in the accommodating cavity 101 and includes a flywheel body 210 and a first rotation shaft 220 extended from the center of the flywheel body 210 along its axial direction, that is, the first rotation shaft 220 can be served as the central axis of the flywheel body 210. The first rotation shaft 220 is rotatably installed in the first shaft hole 102 of the vacuum shell body 110 and is provided with a rotational axis 600. The first rotation shaft 220 can be made from materials with high mechanical strength and is connected to the flywheel body 210 by means of rigid connection. The flywheel 200 is a main energy storage component of the flywheel energy storage device 1 and can store external energy in the form of kinetic energy. The reason for accommodating the flywheel 200 in the accommodating cavity 101 is to eliminate the loss of wind resistance. The radial magnetic gear 300, the disc-type magnetic gear electric motor 400 and the second rotation shaft 500 are coaxial to the rotational axis 600.

Figure 2:
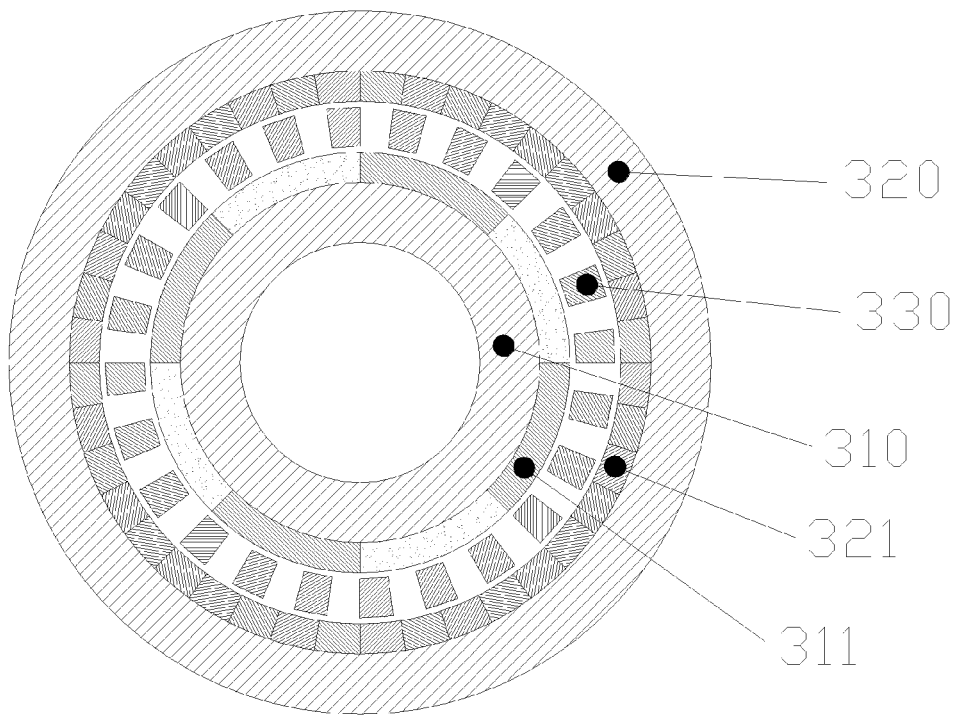
FIG. 2 is a transverse cross-section diagram of a radial magnetic gear of the flywheel energy storage device as shown in FIG. 1.
Figure 3:
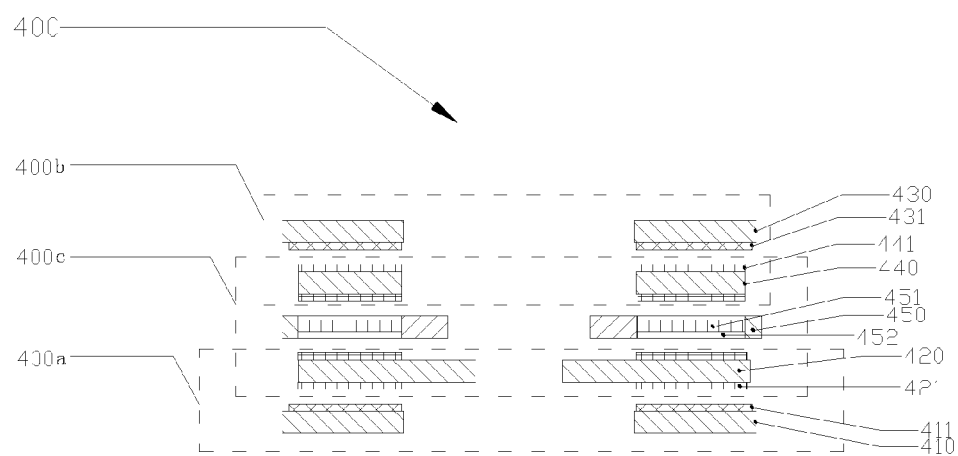
FIG. 3 is a structure diagram of a disc-type magnetic gear electric motor of the flywheel energy storage device as shown in FIG. 1.

Further referring to FIG. 2, FIG. 2 is a transverse cross-section diagram of a radial magnetic gear of the flywheel energy storage device as shown in FIG. 1. The radial magnetic gear 300 includes an inner rotor 310, an outer rotor 320 and $N_1$ first magnetic pole adjustment sheets 330. In detail, the inner rotor 310 is located at the inside of the first magnetic pole adjustment sheet base 120, and the outer rotor 320 is located at the outside of the first magnetic pole adjustment sheet base 120; the inner rotor 310 is coaxially fixed with the first rotation shaft 220, and the outer rotor 320 can be coaxially rotated relative to the inner rotor 310, and the inner rotor 310 and the outer rotor 320 are coaxially spaced in a preset distance. The first magnetic pole adjustment sheet base 120 is located between the outer rotor 320 and the inner rotor 310, and the $N_1$ first magnetic pole adjustment sheets 330 are embedded in the first magnetic pole adjustment sheet base 120.

The $N_1$ first magnetic pole adjustment sheets 330 are uniformly distributed along a first circumference of the first magnetic pole adjustment sheet base 120, and the rotational axis 600 vertically passes through the center of the first circumference. The $N_1$ first magnetic pole adjustment sheets 330 are insulated between each other, and each of the $N_1$ first magnetic pole adjustment sheets 330 is insulated from the vacuum shell 100. The $N_1$ first magnetic pole adjustment sheets 330 can be made from high permeability material, such as silicon steel sheets.

Specifically, the inner rotor 310 is equipped with a first permanent magnet 311 which is magnetized along a radial direction or a parallel direction, and the first permanent magnet 311 is located at an outer wall of the inner rotor 310. The outer rotor 320 is equipped with a second permanent magnet 321 which is magnetized along a radial direction or a parallel direction, and the second permanent magnet 321 is located at an outer wall of the outer rotor 320. Number of pole-pairs of the first permanent magnet 311 is $P_1$, and number of pole-pairs of the second permanent magnet 321 is $P_2$, thus, in order to stabilize transmission energy, the radial magnetic gear 300 need satisfy the following two conditions:

$$N_1 = P_2 + P_1, \qquad 1)$$

wherein, $P_2 > P_1$;

$$\omega_2 = -\frac{P_1 \omega_1}{P_2}, \qquad 2)$$

wherein, $\omega_1$ represents rotational speed of the inner rotor 310, and $\omega_2$ represents rotational speed of the outer rotor 320, and minus sign "−" represents that the rotational speed of the inner rotor 310 is opposite to the rotational speed of the outer rotor 320.

Due to the interaction between magnetic fields of the first permanent magnet 311 of the inner rotor 310 and the second permanent magnet 321 of the outer rotor 320, the radial magnetic gear 300 can transfer movement and power through variable transmission without physical contact. Due to $P_2 > P_1$, when the flywheel 200 is replenished energy from external energy, the rotational speed of the flywheel 200 increase after transformation ration and speed regulation, thus, the charging speed of the flywheel 200 gets faster. When the flywheel 200 releases energy, the rotational speed of the flywheel 200 decreases after transformation ration and speed regulation, thus, the flywheel 200 can provide larger torque for other devices of the outside world.

The disc-type magnetic gear electric motor 400 is installed to the periphery of the outer rotor 320 of the radial magnetic gear 300 and includes a first stator disc 410, a first rotor disc 420, a second stator disc 430, a second rotor disc 440 and a third rotor disc 450, and the first stator disc 410, the first rotor disc 420, the second stator disc 430, the second rotor disc 440 and the third rotor disc 450 have an annulus disc-like shape, and are coaxially arranged with the rotational axis 600. The first stator disc 410 is fixed relative to the vacuum shell body 110, the first rotor disc 420, the third rotor disc 450, the second rotor disc 440, and the second stator disc 430, in turn, are alternately stacked at one side of the first stator disc 410 which is far away from the vacuum shell body 110.

The first stator disc 410 is fixed relative to the vacuum shell body 110 and is located around the first magnetic pole adjustment sheet base 120. The first stator disc 410 is coaxial with the rotational axis 600 and is equipped with a first winding 411.

The first rotor disc 420 is coaxially fixed to the outer rotor 320 and faces toward the first stator disc 410, and the first rotor disc 420 is located at one side of the first stator disc 410 which is far away from the vacuum shell body 110. According to the perspective of the FIG. 1, the first rotor disc 420 is located directly over the first stator disc 410, and includes an upper surface and a lower surface, and each of the upper surface and the lower surface is equipped with a third permanent magnet 421. The third permanent magnet 421 is magnetized along the direction parallel to the rotational axis 600, and number of pole-pairs of the third permanent magnet 421 is $P_3$, wherein, the first winding 411 and the third permanent magnet 421 have the same number of pole-pairs.

The second stator disc 430 is fixed relative to the vacuum shell body 110 and is coaxial with the rotational axis 600.

The second stator disc 430 is provided with a second winding 431, and the second stator disc 430 faces toward the first stator disc 410.

The second rotor disc 440 faces toward the second stator disc 430 and is spaced apart from the first rotor disc 420, that is, the second rotor disc 440 is located with the first rotor disc 420 at a preset distance. The second rotor disc 440 is located at one side of the stator disc 430 which is close to the vacuum shell body 110 and includes an upper surface and a lower surface, and each of the upper surface and the lower surface of the second rotor disc 440 is equipped with a fourth permanent magnet 441. The fourth permanent magnet 441 is magnetized along the direction parallel to the rotational axis 600, and number of pole-pairs of the fourth permanent magnet 441 is $P_4$, wherein, the second winding 431 and the fourth permanent magnet 441 have the same number of pole-pairs.

The third rotor disc 450 is located between the first rotor disc 420 and the second rotor disc 440, and faces toward the first rotor disc 420 and the second rotor disc 440. The third rotor disc 450 is coaxially fixed with the second rotational shaft 500, and includes a second magnetic pole adjustment sheet base 452; $N_2$ second magnetic pole adjustment sheets 451 are embedded in the second magnetic pole adjustment sheet base 452 and are uniformly distributed along a second circumference of the second magnetic pole adjustment sheet base 452. The rotational axis 600 vertically passes through the center of the second circumference. The second pole magnetic adjustment sheet base 452 can be made from high-strength materials including but not limited to enhanced nylon, epoxy resin and phenolic resin, which are non-magnetic conductive and non-conductive materials.

The first stator disc 410 with the first rotor disc 420 form a first disc-type electric motor 400a, the second stator disc 430 with the second rotor disc 440 form a second disc-type electric motor 400b; a disc-type magnetic gear 400c is formed by the first rotor disc 420, the second rotor disc 440 and the third rotor disc 450. The first disc-type electric motor 400a, the second disc-type electric motor 400b and the disc-type magnetic gear 400c are coupled with one another to form the disc-type magnetic gear electric motor 400.

According to the working principle of the magnetic gear, the disc-type magnetic gear 400c need satisfy the following conditions:

$$N_2 = P_3 + P_4, \qquad 3)$$

wherein, $P_3 > P_4$;

$$\omega_5 = \left(-\frac{P_3}{P_4}\omega_3\right) + \frac{N_2}{P_4}\omega_4, \qquad 4)$$

wherein, $\omega_3$ represents rotational speed of the first rotor disc 420, $\omega_4$ represents rotational speed of the second rotor disc 440, and $\omega_5$ represents rotational speed of the third rotor disc 450. Obviously, $\omega_3 = \omega_2$.

The second rotation shaft 500 is coaxially rotated relative to the rotational axis 600, and the third rotor disc 450 is coaxially fixed with the second rotation shaft 500. In this embodiment, the second rotation shaft 500 is served as an input shaft or an output shaft of the flywheel energy storage device 1.

In this embodiment of the present disclosure, the first disc-type electric motor 400a, the second disc-type electric motor 400b and the disc-type magnetic gear 400c are coupled with one another to form the disc-type magnetic gear electric motor 400 which plays an important role in broadening the energy flow path. Functionally, the second rotation shaft 500 is served as an output/input port of the mechanical energy, when the rotational speed of the second rotation shaft 500 is greater than or equal to a preset rotational speed, the flywheel energy storage device 1 can convert, without contact, the mechanical energy of the second rotation shaft 500 into the mechanical energy of the flywheel 200 by means of the disc-type magnetic gear 400c and the radial magnetic gear 300. The flywheel energy storage device 1 can also convert, without contact, the mechanical energy of the second rotation shaft 500 into corresponding electric energy of the first winding 411 and the second winding 431 by means of the disc-type magnetic gear 400c, the first disc-type electric motor 400a, and the second electric motor 400b, and then the electric energy of the first winding 411 and the second winding 431 can be output to corresponding loads, power systems and batteries through corresponding power convertors. When the rotational speed of the second rotation shaft 500 is lower than the preset rotational speed, the flywheel energy storage device 1 can convert the mechanical energy of the flywheel 200 into the mechanical energy of the second rotational shaft 500 by means of the disc-type magnetic gear 400c and the radial magnetic gear 300. The flywheel energy storage device 1 can also convert, without contact, the electric energy of a power system or a battery into the mechanical energy of the second rotation shaft 500 by means of the first disc-type electric motor 400a, the second disc-type electric motor 400b and the disc-type magnetic gear 400c, making the second rotation shaft 500 reach and satisfy the preset rotational speed. The radial magnetic gear 300 and the disc-type magnetic gear 400c meet the relational expressions of rotational speed as shown in Formulas 2) and 4). In this embodiment, the disc-type magnetic gear 400c can realize decoupling of the rotational speed between the second rotation shaft 500 and the flywheel 200 by controlling the rotational speed of the second rotor disc 440.

In this embodiment, structurally speaking, all the radial magnetic gear 300 is coaxially surrounded by the disc-type magnetic gear electric motor 400, and the first stator disc 410 is fixed on the outer wall of the vacuum shell body 110, and the first disc-type electric motor 400a and the second disc-type electric motor 400b are coaxial disc-type structure, therefore shortening the axial length of the whole flywheel energy storage device 1, and also reducing the volume of the whole flywheel energy storage device 1.

Figure 4:
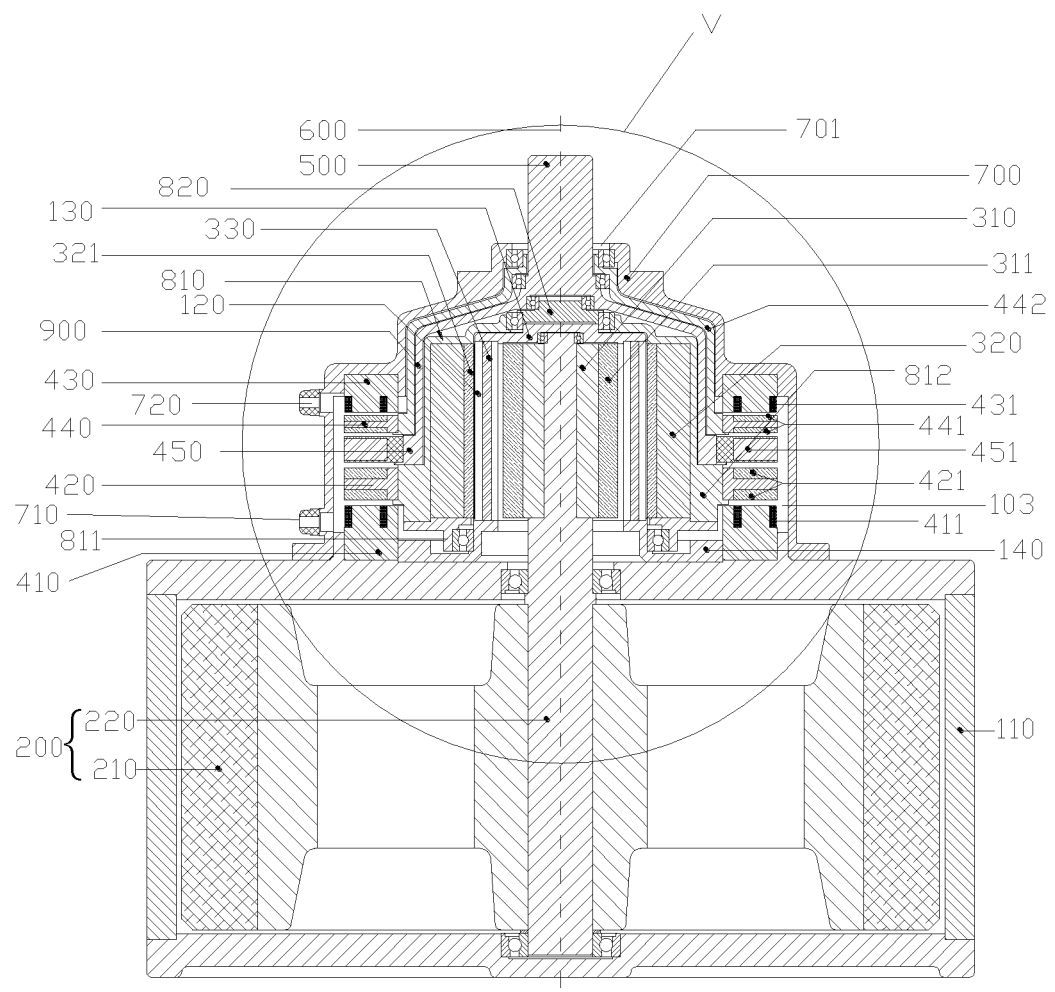
FIG. 4 is an assembly diagram of the flywheel energy storage device according to the embodiment of the present disclosure.
Figure 5:
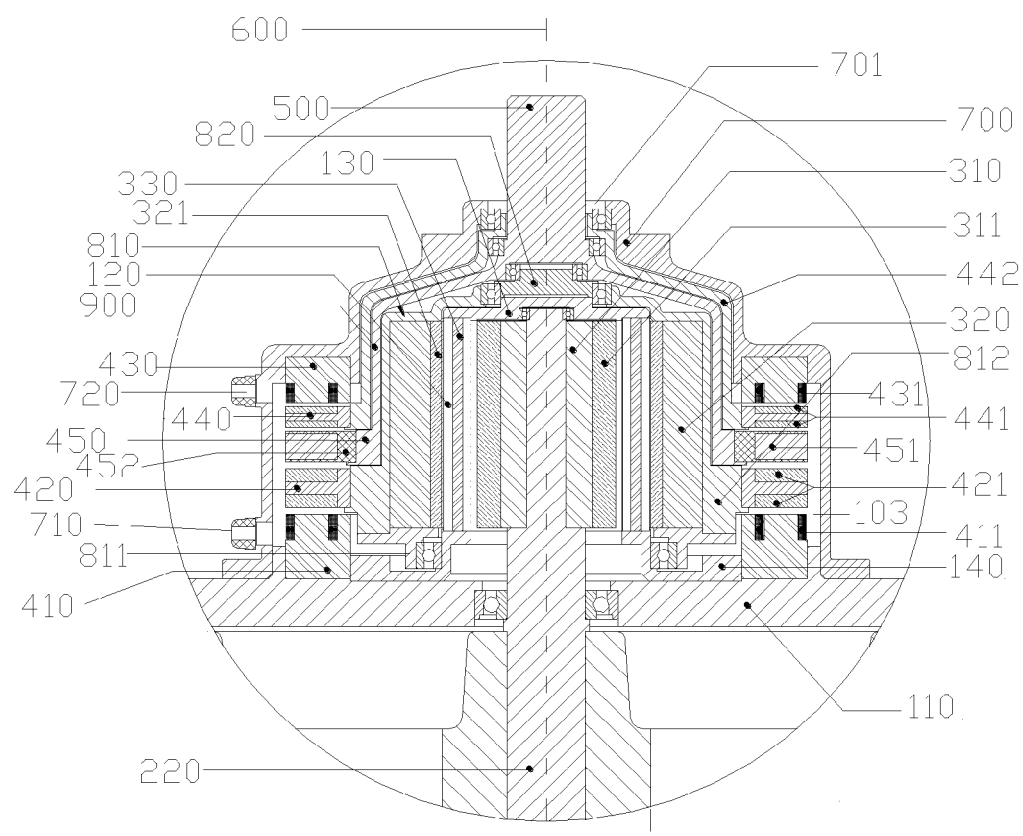
FIG. 5 is an enlarged structure diagram of a part V of the flywheel energy storage device as shown in FIG. 4.

Further referring to FIGS. 4 and 5, in order to make the first rotation shaft 220 rotate more steady, the first rotation shaft 220 is equipped with at least two rotation supports. In this embodiment, a first rotation support is located at the first shaft hole 102 of the vacuum shell body 110, and a second rotation support is located at the bottom wall of the vacuum shell body 110, wherein, the bottom wall is far away from the first shaft hole 102. The first rotation shaft 220 is installed to the vacuum shell body 110 by use of the first rotation support and the second rotation support. In this embodiment, the at least two rotation supports can be, but not limited to, bearings.

In order to coaxially fix the inner rotor 310 with the second rotation shaft 500, an interference fit between the shaft hole of the inner rotor 310 and the second rotation shaft 500 is provided, that is, the shaft hole of the inner rotor 310 is matched with the second rotation shaft 500 by way of the interference fit. In order to easily fasten the first magnetic pole adjustment sheet base 120, the flywheel energy storage device 1 further includes a first fixed base 140 fixed on the outer wall of the vacuum shell body 110. The first fixed base 140 has an annulus disc-like shape, and is arranged with the rotational axis 600 in a coaxial manner. One end of the first magnetic pole adjustment sheet base 120 is fixed to the first fixed base 140, and the other end of the first magnetic pole adjustment sheet base 120 extends along radial direction to form the end cover 130. The accommodating cavity 101 is surrounded by the vacuum shell body 110, the first magnetic pole adjustment sheet base 120, and the end cover 130 to form a seal vacuum room therein. There is a gap between the end cover 130 and the end of the inner rotor 310 which is far away from the vacuum shell body 110. The end of the first rotation shaft 220 which is far away from the vacuum shell body 110 is rotatably supported by the end cover 130.

In order to make the outer rotor 320 rotate more steady, the flywheel energy storage device 1 further includes a first rotation shell 810 and a second rotation shell 820, and the first rotation shell 810 and the second rotation shell 820 are coaxial with the rotational axis 600. The first rotation shell 810 is an empty shell of solid of revolution and includes a rotating base 811 and a rotating cylindrical body 812 fixedly connected to the rotating base 811. The rotating base 811 can be rotatably supported by the first fixed base 140, the rotating cylindrical body 812 defines a second shaft hole at the end which is far away from the vacuum shell body 110, and the second shaft hole is coaxial with the rotational axis 600. The second rotation shell 820 is also designed as a disc-like shape to correspondingly match the second shaft hole, and the second rotation shell 820 is rotatably supported by the second rotation hole. The outer rotor 320 is fixed to the inner wall of the rotating cylindrical body 812 or the rotating base 811. The first rotor disc 420 of the first disc-type electric motor 400a is fixed to the outer wall of the rotating cylindrical body 812.

In order to make the second rotation shaft 500 rotate more steady, the flywheel energy storage device 1 further includes a housing 700 which is an empty shell of solid of revolution, that is, the housing 700 is an empty shell of revolving body. The housing 700 is fixed to the outer wall of the vacuum shell body 110 to form a rotation cavity 103, that is, the rotation cavity 103 is surrounded by the housing 700 and the outer wall of the vacuum shell body 110. The disc-type magnetic gear electric motor 400 is located in the rotation cavity 103. The housing 700 defines a third shaft hole 701 which is coaxial with the rotational axis 600. The second rotation shaft 500 is rotatably supported by the third shaft hole 701, and the end of the second rotation shaft 500 which is close to the vacuum shell body 110 is also rotatably supported by the second rotation shell 820. In order to fixedly connect the second rotation shaft 500 with the third rotor disc 450, the flywheel energy storage device 1 further includes a third rotation shell 900 which is an empty shell of revolving body. One end of the third rotation shell 900 is connected to the second rotation shaft 500 in integral manner, and the other end of the third rotation shell 900 is fixedly connected to the third rotor disc 450. The housing 700 defines a first connection hole 710 and a second connection hole 720 both of which are located at the outer wall of the housing 700, and the first connection hole 710 is electrically connected to the first winding 411 of the first stator disc 410, and the second connection hole 720 is electrically connected to the second winding 431 of the second stator disc 430.

In order to make the second rotor disc 440 of the second disc-type electric motor 400b rotate more steady, the flywheel energy storage device 1 further includes a fourth rotation shell 442 which is an empty shell of solid of revolution, that is, the fourth rotation shell 442 is an empty shell of revolving body. The fourth rotation shell 442 is located between the housing 700 and the third rotation shell 900; one end of the fourth rotation shell 442 is fixedly connected to the second rotor disc 440, and the other end of the fourth rotation shell 442 is rotatably supported by the second rotation shaft 500. The fourth rotation shell 442 extends toward the second rotation shaft 500 from the second rotor disc 440, and the fourth rotation shell 442 can be rotatably connected to the second rotation shaft 500 by means of a rotation support. The second stator disc 430 of the second disc-type electric motor 400*b* is fixed to the inner wall of the housing 700.

Figure 6:
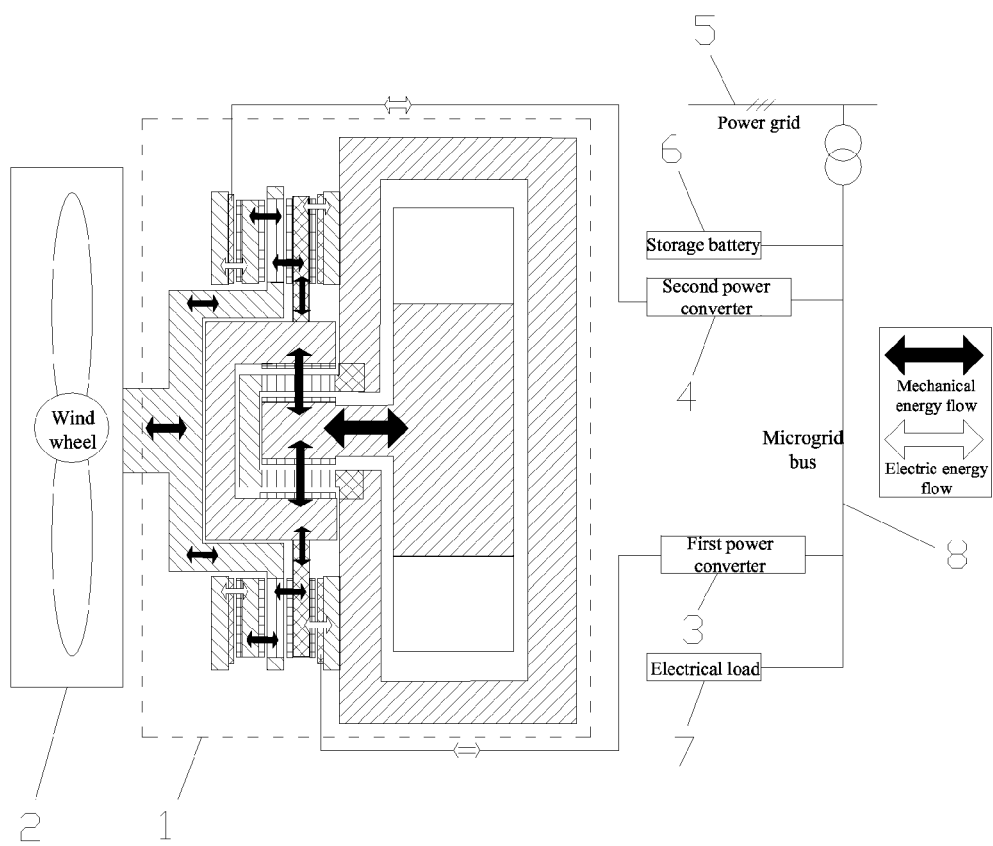
FIG. 6 is a functional block diagram of a wind power generation system according to one embodiment of the present disclosure.

Referring to FIG. 6, FIG. 6 is a functional block diagram of a wind power generation system according to one embodiment of the present disclosure. The flywheel energy storage device 1 above mentioned can be applied to a wind power generation system. In this embodiment, the wind power generation system includes a flywheel energy storage device 1, a wind wheel 2, a first power converter 3, a second power converter 4, a power grid 5, a storage battery 6, and an electrical load 7. The wind wheel 2 is coaxially fixed to the second rotation shaft 500, the first winding 411 of the first disc-type electric motor 400*a* is electrically connected to the power grid 5 through the first power converter 3, and the first power converter 3 is connected to the power grid 5 through a microgrid bus 8. The second winding 431 of the second disc-type electric motor 400*b* is electrically connected to the power grid 5 through the second power converter 4, and the second power converter 4 is connected to the power grid 5 through the microgrid bus 8. The storage battery 6 and the electrical load 7 are electrically connected to the microgrid bus 8.

When the wind wheel 2 rotates at a rotational speed above a predetermined rotational speed or at the predetermined rotational speed, that is, when the rotational speed of the wind wheel 2 exceeds or is equal to a preset rotational speed, the wind wheel 2 can input mechanical energy to the system through the second rotation shaft 500, so as to avoid the rotational speed of the wind wheel 2 rising; at this time, the flywheel energy storage device 1 can directly convert the mechanical energy of the wind wheel 2 into the mechanical energy of the flywheel 200 without contact by means of the disc-type magnetic gear 400*c* and the radial magnetic gear 300. Similarly, in this embodiment, the first disc-type electric motor 400*a* and the second disc-type electric motor 400*b* can be served as electromagnetic power conversion units and can control the rotational speed of the second rotor disc 440 of the second disc-type electric motor 400*b*, so the first disc-type electric motor 400*a* and the second disc-type electric motor 400*b* can realize decoupling of the rotational speed between the second rotation shaft 500 and the flywheel 200 by controlling the rotational speed of the second rotor disc 440 of the second disc-type electric motor 400*b* according to the distribution of required energy and a speed relation of the disc-type magnetic gear 400*c*. The flywheel energy storage device 1 can also convert, without contact, the mechanical energy of the wind wheel 2 into corresponding electric energy of the first winding 411 and the second winding 431 by means of the disc-type magnetic gear 400*c*, the first disc-type electric motor 400*a* and the second disc-type electric motor 400*b*; and then, the first winding 411 transfers the electric energy to the power grid 5, the storage battery 6 or the electrical load 7 through the first power converter 3, and the second winding 431 transfers the electric energy to the power grid 5, the storage battery 6 or the electrical load 7 through the second power converter 4.

That is, the electric energy respectively passes through the first power converter 3 and the second power converter 4, and then is transferred to the power grid 5, the storage battery 6 or the electrical load 7. When the rotational speed of the wind wheel 2 is lower than the preset rotational speed, the flywheel energy storage device 1 can convert the mechanical energy of the flywheel 200 into the mechanical energy of the second rotation shaft 500 by means of the radial magnetic gear 300 and the disc-type magnetic gear 400*c* to avoid the rotational speed of the wind wheel 2 slowing down. Namely, the flywheel energy storage device 1 can adjust fluctuations of wind energy by use of the flywheel 200, which can realize the basic stability of generated output power and power frequency and improve the quality of grid-connected wind power. As shown in FIG. 6, solid black arrows represent mechanical energy flows, and hollow white arrows represent system electric energy flows.

Figure 7:
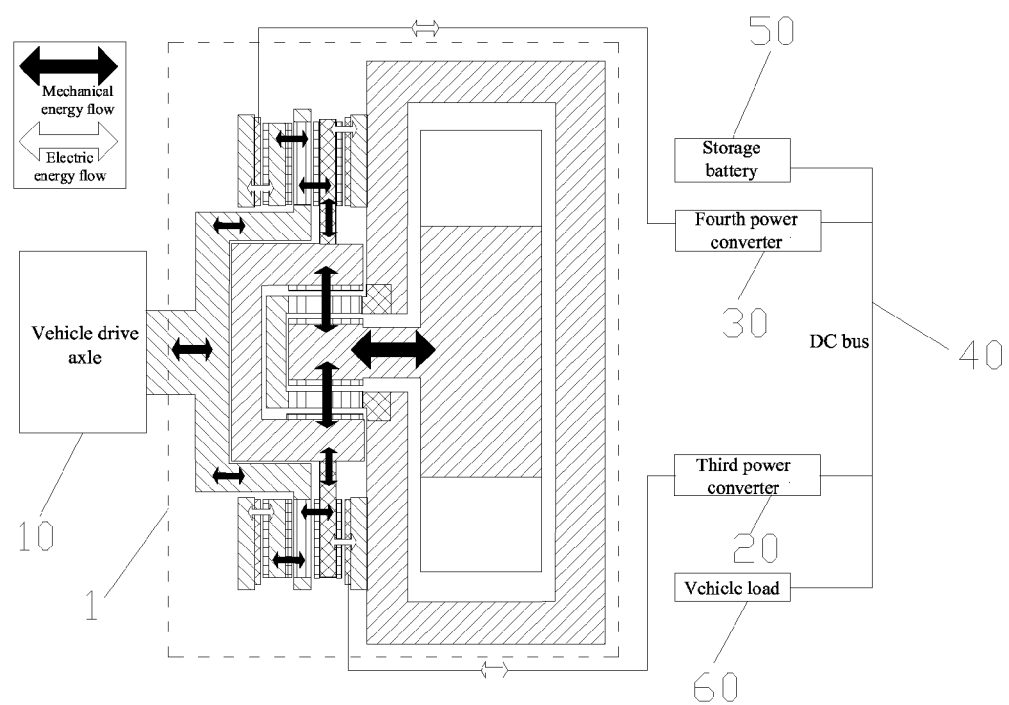
FIG. 7 is a functional block diagram of a vehicle energy feedback brake system according to one embodiment of the present disclosure.

Referring to FIG. 7, FIG. 7 is a functional block diagram of a vehicle energy feedback brake system according to one embodiment of the present disclosure. The flywheel energy storage device 1 can be applied to a vehicle energy feedback brake system. In this embodiment, the vehicle energy feedback brake system includes a flywheel energy storage device 1, a vehicle drive axle 10, a third power converter 20, a fourth power converter 30, a direct current (DC) bus 40, a storage battery 50 and a vehicle load 60. An output shaft of the vehicle drive axle 10 is coaxially fixed to the second rotation shaft 500, the first winding 411 of the first disc-type electric motor 400*a* is electrically connected to the DC bus 40 through the third power converter 20, the second winding 431 of the second disc-type electric motor 400*b* is electrically connected to the DC bus 40 through the fourth power converter 30. The storage battery 50 and the vehicle load 60 are electrically connected to the DC bus 40. Under the action of a controller, the third power converter 20 or the fourth power converter 30 can distribute or control electric power that flows out or flows in the flywheel energy storage device 1 according to the requirements by modulating the switching mode (such as, a switching-on mode, or a switching-off mode) of a power switch tube.

When a vehicle is braking, the flywheel energy storage device 1 can directly transfer braking torque of the vehicle to the flywheel 200 through the disc-type magnetic gear 400*c* and the radial magnetic gear 300; at the same time, the first disc-type electric motor 400*a* and the second disc-type electric motor 400*b* can be served as electromagnetic power conversion units and control the rotational speed of the second rotor disc 440 of the second disc-type electric motor 400*b*, so the first disc-type electric motor 400*a* and the second disc-type electric motor 400*b* can realize decoupling of the rotational speed between the second rotation shaft 500 and the flywheel 200 by controlling the rotational speed of the second rotor disc 440 of the second disc-type electric motor 400*b* according to the distribution of required energy and a speed relation of the disc-type magnetic gear 400*c*. Thus, the flywheel energy storage device 1 can convert braking energy of the vehicle into corresponding electric energy of the first winding 411 and the second winding 431 by means of the disc-type magnetic gear 400*c*, the first disc-type electric motor 400*a* and the second disc-type electric motor 400*b*. The electric energy of the first winding 411 and the second winding 431 passes through the third power converter 20 and the fourth power converter 30 respectively, and then is transferred to the DC bus 40, that is, the electric energy of the first winding 411 and the second winding 431 is transferred to the DC bus 40 through the third power converter 20 and is also transferred to the DC bus 40 through the fourth power converter 30. The electric energy is further stored in the storage battery 50 or is used by the vehicle load 60. When the vehicle accelerates, the flywheel energy storage device 1 can convert the mechanical energy of the flywheel 200 into the mechanical energy of the second rotation shaft 500 by means of the radial magnetic gear 300 and the disc-type magnetic gear 400c so as to provide auxiliary accelerating torque for wheels of the vehicle. In this embodiment, the flywheel energy storage device 1 can also convert the electric energy of the storage battery 50 into the mechanical energy of the second rotation shaft 500 by means of the first disc-type electric motor 400a, the second disc-type electric motor 400b and the disc-type magnetic gear 400c so as to provide auxiliary accelerating torque for the wheels of the vehicle.

According to the above specific embodiments, the flywheel energy storage device 1 of the embodiments in this present disclosure has a flexible energy flow path and can realize multipath transmission of energy among the second rotation shaft 500, the first wind 411, the second wind 431 and the flywheel 200, that is, the energy can be transferred along multiple transmission paths among the second rotation shaft 500, the first wind 411, the second wind 431 and the flywheel 200, thereof satisfying the demands for a variety of ways of energy utilization, supporting direct and efficient energy transfer of "mechanical energy-mechanical energy", and greatly reducing pressures of electric elements on power and capacity. In addition, all transmission of the flywheel energy storage device of the embodiments can be realized by magnetic non-contact structures, which can greatly improve transmission efficiency and enhance robustness of the system.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A flywheel energy storage device, comprising:
a vacuum shell, a flywheel, a radial magnetic gear, a disc-type magnetic gear electric motor and a second rotation shaft; wherein,
the vacuum shell comprises a vacuum shell body, a first magnetic pole adjustment sheet base and an end cover; the vacuum shell defines a vacuum accommodating cavity surrounded by the vacuum shell, and the first magnetic pole adjustment sheet base is installed between the vacuum shell body and the end cover;
the flywheel is accommodated in the accommodating cavity and comprises a first rotation shaft, and the first rotation shaft is rotatably installed to the vacuum shell body;
the radial magnetic gear comprises an inner rotor, an outer rotor and $N_1$ first magnetic pole adjustment sheets; the inner rotor is located at the inside of the first magnetic pole adjustment sheet base, and the outer rotor is located at the outside of the first magnetic pole adjustment sheet base; the inner rotor is coaxially fixed with the first rotation shaft, and the inner rotor is provided with a first permanent magnet; the outer rotor is coaxially rotated relative to the inner rotor, and the outer rotor is provided with a second permanent magnet; and the $N_1$ first magnetic pole adjustment sheets are embedded in the first magnetic pole adjustment sheet base;
the disc-type magnetic gear electric motor is installed to the periphery of the outer rotor of the radial magnetic gear and comprises a first stator disc, a first rotor disc, a second stator disc, a second rotor disc and a third rotor disc, and the first stator disc, the first rotor disc, the second stator disc, the second rotor disc and the third rotor disc have an annulus disc-like shape, and are arranged with the first rotation shaft in a coaxial manner; the first stator disc is fixed relative to the vacuum shell body, the first rotor disc, the third rotor disc, the second rotor disc, and the second stator disc, in turn, are alternately stacked at one side of the first stator disc which is far away from the vacuum shell body; wherein,
the first stator disc is provided with a first winding;
the first rotor disc is fixed to the outer rotor and faces toward the first stator disc, and the first rotor disc is provided with a third permanent magnet;
the second stator disc is fixed relative to the vacuum shell and is provided with a second winding, and the second stator disc faces toward the first stator disc;
the second rotor disc faces toward the second stator disc and is provided with a fourth permanent magnet;
the third rotor disc faces toward the first rotor disc and the second rotor disc, and $N_2$ second magnetic pole adjustment sheets are embedded in the third rotor disc;
the first stator disc with the first rotor disc form a first disc-type electric motor, the second stator disc with the second rotor disc form a second disc-type electric motor; a disc-type magnetic gear is formed by the first rotor disc, the second rotor disc and the third rotor disc, and the first disc-type electric motor, the second disc-type electric motor and the disc-type magnetic gear are coupled with one another to form the disc-type magnetic gear electric motor; and
the second rotation shaft is coaxially fixed with the third rotor disc.

2. The flywheel energy storage device according to claim 1, wherein the first permanent magnet is magnetized along a radial direction or a parallel direction, the second permanent magnet is magnetized along a radial direction or a parallel direction; the $N_1$ first magnetic pole adjustment sheets are uniformly distributed along a first circumference of the first magnetic pole adjustment sheet base, and a rotational axis vertically passes through the center of the first circumference; the $N_1$ first magnetic pole adjustment sheets are insulated between each other, and each of the $N_1$ first magnetic pole adjustment sheets is insulated from the vacuum shell.

3. The flywheel energy storage device according to claim 2, wherein the third permanent magnet and the fourth permanent magnet are magnetized along the direction parallel to the rotational axis; the third rotor disc comprises a second magnetic pole adjustment sheet base, the $N_2$ second magnetic pole adjustment sheets are embedded in the second magnetic pole adjustment sheet base and are uniformly distributed along a second circumference of the second magnetic pole adjustment sheet base; the rotational axis vertically passes through the center of the second circumference.

4. The flywheel energy storage device according to claim 1, wherein the flywheel energy storage device comprises a housing fixed to an outer wall of the vacuum shell body, and the housing and the vacuum shell body form a rotation cavity, and the second rotation shaft is rotatably installed to the housing and extends out from the housing.

5. The flywheel energy storage device according to claim 4, wherein the flywheel energy storage device comprises a first fixed base coaxial with the rotational axis, and the first fixed base is fixed on the outer wall of the vacuum shell body; one end of the first magnetic pole adjustment sheet base is fixed to the first fixed base, and the other end of the first magnetic pole adjustment sheet base extends along radial direction to form the end cover.

6. The flywheel energy storage device according to claim 5, wherein the flywheel energy storage device further comprises a first rotation shell and a second rotation shell, and the first rotation shell and the second rotation shell are coaxial with the rotational axis; the first rotation shell comprises a rotating base and a rotating cylindrical body, and the first rotating base is fixed to one end of the rotating cylindrical body and is rotatably supported by the first fixed base; the rotating cylindrical body defines a second shaft hole, and the second shaft hole is located at one end of the rotating cylindrical body which is far away from the vacuum shell body, and the second shaft hole is coaxial with the rotational axis; the second rotation shell is a disc-like shape to correspondingly match the second shaft hole, and the second rotation shell is rotatably supported by the second rotation hole; the outer rotor is fixed to an inner wall of the rotating cylindrical body, and one end of the second rotation shaft which is close to the vacuum shell body is rotatably supported by the second rotation shell.

7. The flywheel energy storage device according to claim 4, wherein the flywheel energy storage device further comprises a third rotation shell coaxial with the rotational axis, and the third rotation shell is an empty shell of revolving body; one end of the third rotation shell is connected to the second rotation shaft in integral manner, and the other end of the third rotation shell is fixedly connected to the third rotor disc;
the flywheel energy storage device further comprises a fourth rotation shell coaxial with the rotational axis, and the fourth rotation shell is an empty shell of revolving body; one end of the fourth rotation shell is fixedly connected to the second rotor disc, and the other end of the fourth rotation shell is rotatably supported by the second rotation shaft.

8. The flywheel energy storage device according to claim 4, wherein the housing defines a first connection hole and a second connection hole both of which are located at an outer wall of the housing; the first connection hole is electrically connected to the first winding of the first stator disc, and the second connection hole is electrically connected to the second winding of the second stator disc.

9. A wind power generation system, comprising: a wind wheel, a first power converter, a second power converter, a power grid, and a flywheel energy storage device, the flywheel energy storage device comprising:
a vacuum shell, a flywheel, a radial magnetic gear, a disc-type magnetic gear electric motor and a second rotation shaft; wherein,
the vacuum shell comprises a vacuum shell body, a first magnetic pole adjustment sheet base and an end cover; the vacuum shell defines a vacuum accommodating cavity surrounded by the vacuum shell, and the first magnetic pole adjustment sheet base is installed between the vacuum shell body and the end cover;
the flywheel is accommodated in the accommodating cavity and comprises a first rotation shaft, and the first rotation shaft is rotatably installed to the vacuum shell body;
the radial magnetic gear comprises an inner rotor, an outer rotor and $N_1$ first magnetic pole adjustment sheets; the inner rotor is located at the inside of the first magnetic pole adjustment sheet base, and the outer rotor is located at the outside of the first magnetic pole adjustment sheet base; the inner rotor is coaxially fixed with the first rotation shaft, and the inner rotor is provided with a first permanent magnet; the outer rotor is coaxially rotated relative to the inner rotor, and the outer rotor is provided with a second permanent magnet; and the $N_1$ first magnetic pole adjustment sheets are embedded in the first magnetic pole adjustment sheet base;
the disc-type magnetic gear electric motor is installed to the periphery of the outer rotor of the radial magnetic gear and comprises a first stator disc, a first rotor disc, a second stator disc, a second rotor disc and a third rotor disc, and the first stator disc, the first rotor disc, the second stator disc, the second rotor disc and the third rotor disc have an annulus disc-like shape, and are arranged with the first rotation shaft in a coaxial manner; the first stator disc is fixed relative to the vacuum shell body, the first rotor disc, the third rotor disc, the second rotor disc, and the second stator disc, in turn, are alternately stacked at one side of the first stator disc which is far away from the vacuum shell body; wherein,
the first stator disc is provided with a first winding;
the first rotor disc is fixed to the outer rotor and faces toward the first stator disc, and the first rotor disc is provided with a third permanent magnet;
the second stator disc is fixed relative to the vacuum shell and is provided with a second winding, and the second stator disc faces toward the first stator disc;
the second rotor disc faces toward the second stator disc and is provided with a fourth permanent magnet;
the third rotor disc faces toward the first rotor disc and the second rotor disc, and $N_2$ second magnetic pole adjustment sheets are embedded in the third rotor disc;
the first stator disc with the first rotor disc form a first disc-type electric motor, the second stator disc with the second rotor disc form a second disc-type electric motor; a disc-type magnetic gear is formed by the first rotor disc, the second rotor disc and the third rotor disc, and the first disc-type electric motor, the second disc-type electric motor and the disc-type magnetic gear are coupled with one another to form the disc-type magnetic gear electric motor; and
the second rotation shaft is coaxially fixed with the third rotor disc;
wherein the wind wheel is coaxially fixed to the second rotation shaft, the first winding of the first disc-type electric motor is electrically connected to the power grid through the first power converter, and the second winding of the second disc-type electric motor is electrically connected to the power grid through the second power converter.

10. A vehicle energy feedback brake system, comprising: a vehicle drive axle, a third power converter, a fourth power converter, a direct current (DC) bus, and a flywheel energy storage device, the flywheel energy storage device comprising:
a vacuum shell, a flywheel, a radial magnetic gear, a disc-type magnetic gear electric motor and a second rotation shaft; wherein,
the vacuum shell comprises a vacuum shell body, a first magnetic pole adjustment sheet base and an end cover; the vacuum shell defines a vacuum accommodating cavity surrounded by the vacuum shell, and the first magnetic pole adjustment sheet base is installed between the vacuum shell body and the end cover;

the flywheel is accommodated in the accommodating cavity and comprises a first rotation shaft, and the first rotation shaft is rotatably installed to the vacuum shell body;

the radial magnetic gear comprises an inner rotor, an outer rotor and $N_1$ first magnetic pole adjustment sheets; the inner rotor is located at the inside of the first magnetic pole adjustment sheet base, and the outer rotor is located at the outside of the first magnetic pole adjustment sheet base; the inner rotor is coaxially fixed with the first rotation shaft, and the inner rotor is provided with a first permanent magnet; the outer rotor is coaxially rotated relative to the inner rotor, and the outer rotor is provided with a second permanent magnet; and the $N_1$ first magnetic pole adjustment sheets are embedded in the first magnetic pole adjustment sheet base;

the disc-type magnetic gear electric motor is installed to the periphery of the outer rotor of the radial magnetic gear and comprises a first stator disc, a first rotor disc, a second stator disc, a second rotor disc and a third rotor disc, and the first stator disc, the first rotor disc, the second stator disc, the second rotor disc and the third rotor disc have an annulus disc-like shape, and are arranged with the first rotation shaft in a coaxial manner; the first stator disc is fixed relative to the vacuum shell body, the first rotor disc, the third rotor disc, the second rotor disc, and the second stator disc, in turn, are alternately stacked at one side of the first stator disc which is far away from the vacuum shell body; wherein, the first stator disc is provided with a first winding;

the first rotor disc is fixed to the outer rotor and faces toward the first stator disc, and the first rotor disc is provided with a third permanent magnet;

the second stator disc is fixed relative to the vacuum shell and is provided with a second winding, and the second stator disc faces toward the first stator disc;

the second rotor disc faces toward the second stator disc and is provided with a fourth permanent magnet;

the third rotor disc faces toward the first rotor disc and the second rotor disc, and $N_2$ second magnetic pole adjustment sheets are embedded in the third rotor disc;

the first stator disc with the first rotor disc form a first disc-type electric motor, the second stator disc with the second rotor disc form a second disc-type electric motor; a disc-type magnetic gear is formed by the first rotor disc, the second rotor disc and the third rotor disc, and the first disc-type electric motor, the second disc-type electric motor and the disc-type magnetic gear are coupled with one another to form the disc-type magnetic gear electric motor; and the second rotation shaft is coaxially fixed with the third rotor disc;

wherein an output shaft of the vehicle drive axle is coaxially fixed to the second rotation shaft, the first winding of the first disc-type electric motor is electrically connected to the DC bus through the third power converter, and the second winding of the second disc-type electric motor is electrically connected to the DC bus through the fourth power converter.

11. The wind power generation system according to claim 9, wherein the first permanent magnet is magnetized along a radial direction or a parallel direction, the second permanent magnet is magnetized along a radial direction or a parallel direction; the $N_1$ first magnetic pole adjustment sheets are uniformly distributed along a first circumference of the first magnetic pole adjustment sheet base, and a rotational axis vertically passes through the center of the first circumference; the $N_1$ first magnetic pole adjustment sheets are insulated between each other, and each of the $N_1$ first magnetic pole adjustment sheets is insulated from the vacuum shell; and the third permanent magnet and the fourth permanent magnet are magnetized along the direction parallel to the rotational axis; the third rotor disc comprises a second magnetic pole adjustment sheet base, the $N_2$ second magnetic pole adjustment sheets are embedded in the second magnetic pole adjustment sheet base and are uniformly distributed along a second circumference of the second magnetic pole adjustment sheet base; the rotational axis vertically passes through the center of the second circumference.

12. The wind power generation system according to claim 9, wherein the flywheel energy storage device comprises a housing fixed to an outer wall of the vacuum shell body, and the housing and the vacuum shell body form a rotation cavity, and the second rotation shaft is rotatably installed to the housing and extends out from the housing.

13. The wind power generation system according to claim 12, wherein the flywheel energy storage device comprises a first fixed base coaxial with the rotational axis, and the first fixed base is fixed on the outer wall of the vacuum shell body; one end of the first magnetic pole adjustment sheet base is fixed to the first fixed base, and the other end of the first magnetic pole adjustment sheet base extends along radial direction to form the end cover.

14. The wind power generation system according to claim 13, wherein the flywheel energy storage device further comprises a first rotation shell and a second rotation shell, and the first rotation shell and the second rotation shell are coaxial with the rotational axis; the first rotation shell comprises a rotating base and a rotating cylindrical body, and the first rotating base is fixed to one end of the rotating cylindrical body and is rotatably supported by the first fixed base; the rotating cylindrical body defines a second shaft hole, and the second shaft hole is located at one end of the rotating cylindrical body which is far away from the vacuum shell body, and the second shaft hole is coaxial with the rotational axis; the second rotation shell is a disc-like shape to correspondingly match the second shaft hole, and the second rotation shell is rotatably supported by the second rotation hole; the outer rotor is fixed to an inner wall of the rotating cylindrical body, and one end of the second rotation shaft which is close to the vacuum shell body is rotatably supported by the second rotation shell.

15. The wind power generation system according to claim 12, wherein the flywheel energy storage device further comprises a third rotation shell coaxial with the rotational axis, and the third rotation shell is an empty shell of revolving body; one end of the third rotation shell is connected to the second rotation shaft in integral manner, and the other end of the third rotation shell is fixedly connected to the third rotor disc;

the flywheel energy storage device further comprises a fourth rotation shell coaxial with the rotational axis, and the fourth rotation shell is an empty shell of revolving body; one end of the fourth rotation shell is fixedly connected to the second rotor disc, and the other end of the fourth rotation shell is rotatably supported by the second rotation shaft.

16. The vehicle energy feedback brake system according to claim 10, wherein the first permanent magnet is magnetized along a radial direction or a parallel direction, the second permanent magnet is magnetized along a radial direction or a parallel direction; the $N_1$ first magnetic pole adjustment sheets are uniformly distributed along a first circumference of the first magnetic pole adjustment sheet base, and a rotational axis vertically passes through the center of the first circumference; the $N_1$ first magnetic pole adjustment sheets are insulated between each other, and each of the $N_1$ first magnetic pole adjustment sheets is insulated from the vacuum shell; and the third permanent magnet and the fourth permanent magnet are magnetized along the direction parallel to the rotational axis; the third rotor disc comprises a second magnetic pole adjustment sheet base, the $N_2$ second magnetic pole adjustment sheets are embedded in the second magnetic pole adjustment sheet base and are uniformly distributed along a second circumference of the second magnetic pole adjustment sheet base; the rotational axis vertically passes through the center of the second circumference.

17. The vehicle energy feedback brake system according to claim 10, wherein the flywheel energy storage device comprises a housing fixed to an outer wall of the vacuum shell body, and the housing and the vacuum shell body form a rotation cavity, and the second rotation shaft is rotatably installed to the housing and extends out from the housing.

18. The vehicle energy feedback brake system according to claim 17, wherein the flywheel energy storage device comprises a first fixed base coaxial with the rotational axis, and the first fixed base is fixed on the outer wall of the vacuum shell body; one end of the first magnetic pole adjustment sheet base is fixed to the first fixed base, and the other end of the first magnetic pole adjustment sheet base extends along radial direction to form the end cover.

19. The vehicle energy feedback brake system according to claim 18, wherein the flywheel energy storage device further comprises a first rotation shell and a second rotation shell, and the first rotation shell and the second rotation shell are coaxial with the rotational axis; the first rotation shell comprises a rotating base and a rotating cylindrical body, and the first rotating base is fixed to one end of the rotating cylindrical body and is rotatably supported by the first fixed base; the rotating cylindrical body defines a second shaft hole, and the second shaft hole is located at one end of the rotating cylindrical body which is far away from the vacuum shell body, and the second shaft hole is coaxial with the rotational axis; the second rotation shell is a disc-like shape to correspondingly match the second shaft hole, and the second rotation shell is rotatably supported by the second rotation hole; the outer rotor is fixed to an inner wall of the rotating cylindrical body, and one end of the second rotation shaft which is close to the vacuum shell body is rotatably supported by the second rotation shell.

20. The vehicle energy feedback brake system according to claim 17, wherein the flywheel energy storage device further comprises a third rotation shell coaxial with the rotational axis, and the third rotation shell is an empty shell of revolving body; one end of the third rotation shell is connected to the second rotation shaft in integral manner, and the other end of the third rotation shell is fixedly connected to the third rotor disc;

the flywheel energy storage device further comprises a fourth rotation shell coaxial with the rotational axis, and the fourth rotation shell is an empty shell of revolving body; one end of the fourth rotation shell is fixedly connected to the second rotor disc, and the other end of the fourth rotation shell is rotatably supported by the second rotation shaft.

\* \* \* \* \*